United States Patent

Hobbs

[15] 3,695,397
[45] Oct. 3, 1972

[54] TORTUOUS GRIP ROPE BRAKE

[72] Inventor: Edwin L. Hobbs, 10 Lance Court, Contra Costa, Calif. 94556

[22] Filed: May 28, 1971

[21] Appl. No.: 147,873

[52] U.S. Cl. .................................. 188/65.4, 182/5
[51] Int. Cl. ............................................. B65h 59/14
[58] Field of Search.......... 188/65.1, 65.2, 65.3, 65.4, 188/65.5; 182/5, 6, 7

[56] References Cited

UNITED STATES PATENTS

| 542,641 | 7/1895 | Hembacher | 188/65.5 |
| 3,217,840 | 11/1965 | Holkesvick | 188/65.4 |

FOREIGN PATENTS OR APPLICATIONS

| 239,832 | 6/1967 | U.S.S.R. | 188/65.4 |

Primary Examiner—George E. A. Halvosa
Attorney—Milmore & Cypher

[57] ABSTRACT

A device for use with an elongated flexible member consisting briefly of a frame having an opening adapted for connection to rings or other lines; a pair of enclosed openings one of which is openable, and side and cross members providing a plurality of friction surfaces for various line configurations to accomplish releasable engagement with a line and controllable descent on said line. A closeable gate means permits the device to be used as a hook and to prevent accidental loss of contact with a line. The device, in a modified form consists of a brake bar which provides automatic braking in descent modes and automatic holding in ascent applications.

8 Claims, 8 Drawing Figures

PATENTED OCT 3 1972  3,695,397

EDWIN L. HOBBS
INVENTOR.

BY Milmore & Cypher

ATTORNEY

EDWIN L. HOBBS
INVENTOR.

BY

ATTORNEY

TORTUOUS GRIP ROPE BRAKE

BACKGROUND OF THE INVENTION

The device of the present invention is designed to be used by persons who must descend, ascend and tie off using only ropes or lines in working in and around buildings, trees, aircraft and other equipment. This device is not within the classification of mountain climbing equipment although it can be used as such. The device is primarily useful by those whose work requires them to be tied to a line for the greater part of their work but with the ability to ascend quickly on the same line or rope and to tie off again at the next work station with the same speed.

Prior devices either lacked a gate or lacked a gate which had a positive lock.

SUMMARY OF THE INVENTION

The gist of the present invention is a multipurpose line apparatus having a positive locking gate. Further, the locking gate is so constructed that a biasing means can be used with the device to automatically lock the brake bar when the device is moved relative to the line.

An object of the present invention is to provide a device which has a multiplicity of uses with a line yet is light weight, has a minimum of moving parts and is relatively inexpensive.

Another object is to provide a fail safe device which will automatically arrest descent when the brake bar is released.

A further object is to provide a device which may be attached to the middle of a line without threading the ends through the device.

Still another object is to provide a device which may be made an integral part of a block and tackle.

A still further object is to provide a multipurpose device which may be used by persons engaged in tree service, painters, steel workers, carpenters, roofers, steeplejacks, shipworkers, bridgebuilders, riggers or other workers who must work in precarious positions aloft.

Another object is to provide a device which can be used with a winch or tie-down situation as on a truck or ship.

Another object is to provide a device for use by aerial workers in tying off their platforms or for independent attachment to a fall line.

A still further object is to provide a device which when used in pairs can be used to ascend a rope.

DESCRIPTION OF THE PREFERRED EMBODIMENTS

Figure 1:
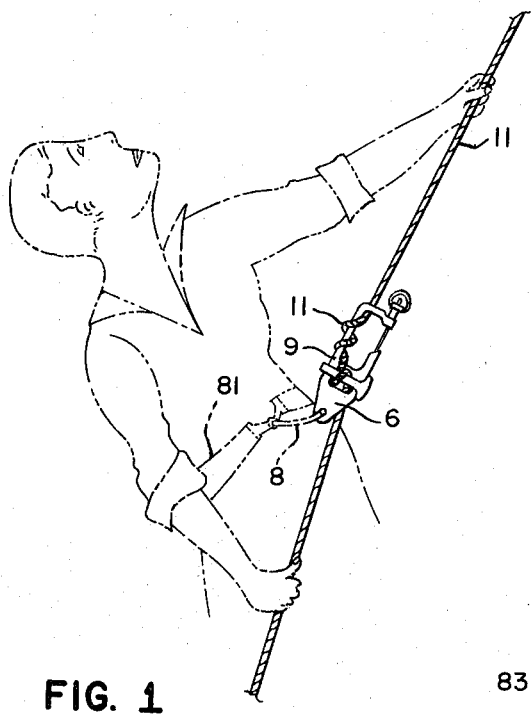
FIG. 1 is a perspective view showing one of the various uses of the device in combination with other equipment.

The line apparatus of the present invention consists briefly of a base member 6 having an opening 7 therein adapted for receiving a ring 8 or flexible line; a first elongated side member 9 connected to said base and extending therefrom at substantially a right angle and adapted for receiving an elongated line wound thereon; a second elongated side member 12 connected to said base and spaced from said first side member, extending in substantially the same plane as said base and first side member and terminating in a stub post 13; a cross member 14 spaced from said base and joining said first and second sides and forming a first enclosed opening 16 having an area several times greater than the area of a line adapted to be received therethrough; an elongated top member 17 joining said first side member and extending at substantially right angles therefrom, spaced from said cross member and said base and in substantially the same plane therewith and spaced from the end of said stub post forming an opening 18 therebetween; gate means having a first position providing a clear opening between said top member and the end of said stub post and a second position closing said opening; means releasably locking said gate in said second position; and the side members, the cross member, the top member and the gate means forming an enclosed opening having an area greater than the first enclosed opening.

The device is preferably made from a light weight metal such as aluminum or magnesium. All surfaces of the metal should be rounded to avoid cutting the rope or line. The device is preferably made with all parts in the same plane but variations can be made with some parts at an angle which do not come in contact with the brake bar.

The gate means consists briefly of an elongated tube 21; an elongated rod 22 positioned within said tube and moveable from a first "lock" position to a second "unlock" position; spring means 23 biasing said rod to said first "lock" position; lock means 24 operatively connected to said rod and protruding from said tube in said first position of said rod and moveable to a non-protruding position in the second "unlocked" position of the rod; the top member having an opening 26 therethrough to permit the tube to slide therethrough and the stub post having an opening 27 axially therethrough to permit entry of the tube and movement through a portion thereof; and stop means 28 engaging the lock means in the first "locked" position of the rod.

The gate means also includes a finger engageable ring 29 connected to the tube so as to remove the gate from the device. The rod and tube locking arrangement can be constructed in several ways but as here shown, the rod is provided with a shoulder 31 which engages the spring 23. The spring is retained at its other end on a shoulder 32. The rod is retained in the "lock" position by the spring 23 urging shoulder 31 upwardly as shown in the drawings. In the "lock" position, the rod 22 urges ball bearings 33 and 34 (also indicated by the number 24) through circular openings 36 and 37 which are slightly smaller in diameter than the ball bearings but large enough to permit the bearings to protrude beyond the outside surface of the tube 21. When the bearings are held outwardly (locked position) by the rod 22, they engage the sides of opening 38 and thus prevent the tube 21 from being withdrawn from the gate opening 18.

The gate opening is sufficiently wide to permit the device to be attached to closed rings, ladder rungs, posts and other anchorages of convenience. The gate is also sufficiently wide to accommodate the receipt of a wide range of rope diameters to the opening formed by the sides, top and cross member. Structurally, the rod 21 serves to support the brake bar 91 when it is used in the position shown in FIGS. 6 and 7.

Figure 4:
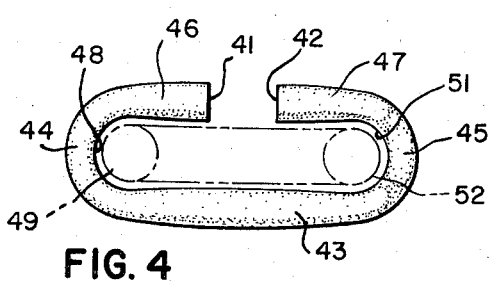
FIG. 4 is a top plan view of the brake bar shown in combination with a portion of the device.
Figure 3:
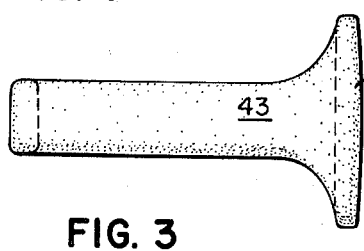
FIG. 3 is a side view of the brake bar.
Figure 5:
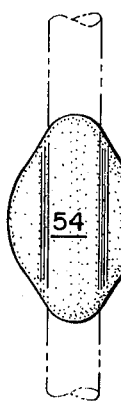
FIG. 5 is an end view of the brake bar with the other portions of the device in broken line.

Construction of one form of the brake bar is shown in FIGS. 3–5. The bar is made from a lightweight metal such as aluminum or magnesium in the form of a rigid band dimensioned to closely encircle the side members and to freely slide longitudinally thereover. It is further dimensioned to be in close fitting relationship with the top member and the cross member and is adapted to receive a line between the band and the top member and the cross member in binding relationship so as to prevent further sliding on the sides and to lock the line in fixed relationship therewith.

The brake bar may be either a closed ring or open as shown in the drawings; thus being in the shape of a C with the ends of the bands 41 and 42 occuring generally between the side members. Referring specifically to the brake band, it is composed of an elongated side 43, curved ends 44 and 45 and terminating in short ends 46 and 47. Inner surface 48 slidably engages outer surface 49 of the side member of the device and inner surface 51 slideably engages outer surface 52 of the device. As shown in FIGS. 3 and 5, one end of the brake band may be formed with an enlarged head 54 having a length capable of spanning the gate opening 18 to minimize strain on the gate tube.

Figure 6:
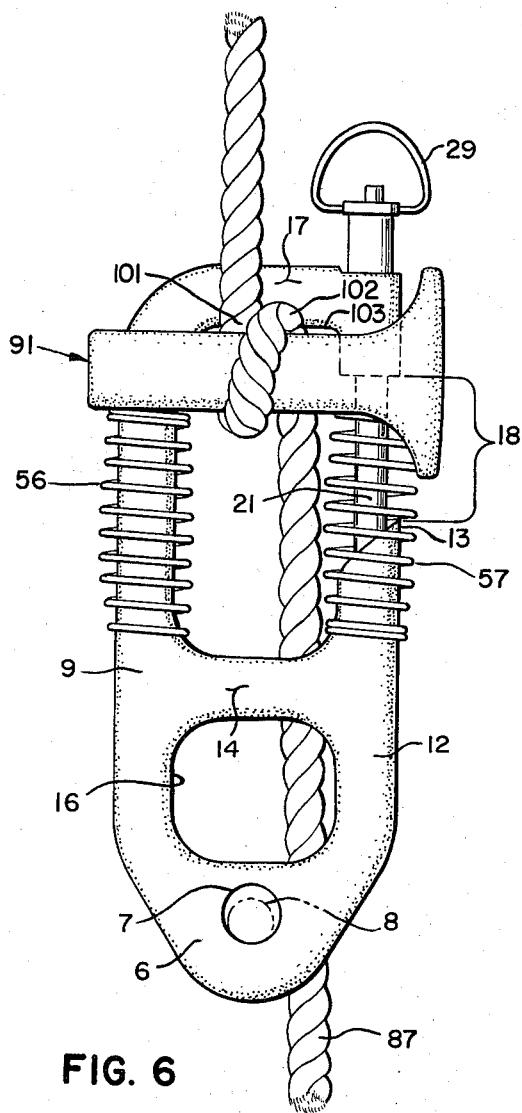
FIG. 6 is a side view of an alternate form of the device.

Another form of the invention is shown in FIG. 6 wherein a biasing means urges the brake bar into a clamping engagement with the line and the top member. The biasing means includes a pair of coil springs 56 and 57 with the first spring mounted around the first side member between the cross member and the top member and the second spring being mounted around the gate means between the cross member and the top member. The brake bar is identical to the bar shown and described in FIGS. 3–5.

Figure 7:
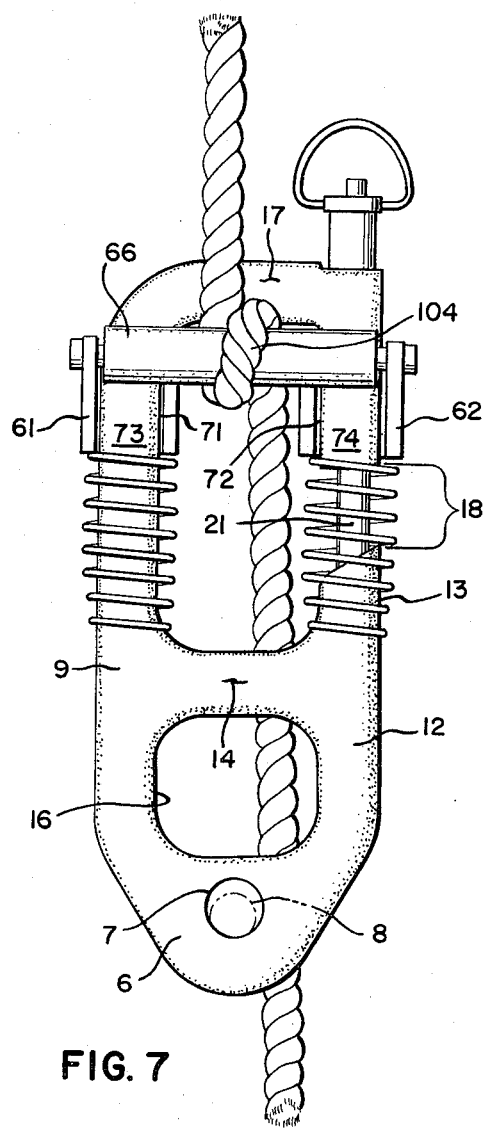
FIG. 7 is a side view of still another form of the device.
Figure 8:
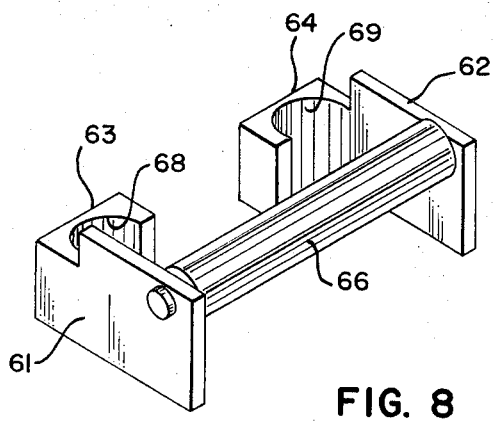
FIG. 8 is a perspective view of the brake bar shown in FIG. 7.

Another form of brake bar is shown in FIGS. 7 and 8 which includes a pair of side bracket members 61 and 62 having portions 63 and 64 closely and partially encircling the side members and a roller 66 mounted for free rotation between the bracket members and spaced from the shaped portions to closely encircle and ride freely over a face of the apparatus and being shaped and dimensioned to be in close fitting relationship with the top member and the cross member and adapted to receive a line between the roller and the top member and the cross member in binding relationship so as to prevent further sliding on the sides and to lock the line in fixed relationship therewith. The shaped portions have cylindrical faces 68 and 69 which move freely in relationship to the outside surfaces 71 and 72 as shown in FIG. 7. The roller moves over outside surfaces 73 and 74.

Operation of the invention in connection with ropes and lines is so varied as to defy even a complete listing much less a complete description of the use of the device with various rope or line configurations.

Figure 2:
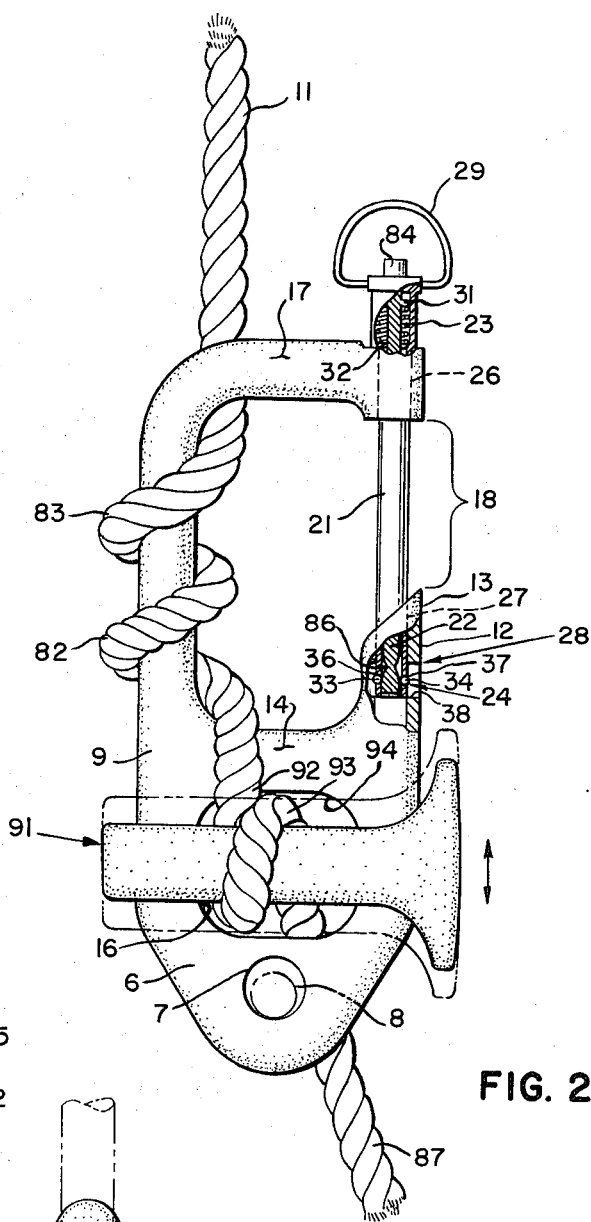
FIG. 2 is a side view of the device with portions removed and in cross section to more clearly explain the device. The broken lines indicate various positions of the brake bar.

One use of the invention is shown in FIGS. 1 and 2 in which a person is outlined wearing a waist belt 81 and a ring 8 attached thereto. The ring 8 is connected to the opening 7 and the device attached to a line either by threading a line therethrough or preferably inserting the line through the gate opening and placing one or more turns 82 and 83 around side 9. The gate is opened by pressing downwardly on button 84 which moves rod 22 downwardly against the biasing of spring 23. Rod 22 has an annular restricted portion 86 and permits the ball bearings to move inwardly. Grasping the ring 29, the tube is moved upwardly, and as the ball bearings reach the edges of the opening 38, they are moved inwardly and the tube 21 may be removed from the post opening 27 and expose some or all of opening 18. The lock means is constructed so that the entire means may be withdrawn from opening 26 in the top member. The operator may descend the rope by grasping end 87 and control his descent by permitting the rope to feed around the side member. The friction of the wraps on the side member permits a person to descend with little actual effort in holding end 87. The operator may "tie-off" by placing a wrap around post 13 (when the gate is open) but a simple brake bar makes "stopping" much easier. This is accomplished by use of the brake bar. Since the brake bar preferably has an opening between the ends 41 and 42, it too can be attached to the mid portion of a line so that if for example a fireman or other rescue worker wishes to come out a fifth story window he can attach the device to a fall line extended from an upper floor or the roof to the ground. Note that the brake bar must be in the upper position as shown in FIG. 6 to attach the brake bar to the mid point of the line without threading the ends. To use the brake bar as shown in FIG. 2, it must be threaded from the end.

In using the brake bar, end 87 is pulled downwardly, which brings brake bar 91 shown in FIG. 2 down so as to release the brake bar from snubbing or pinching portions 92 and 93 of the rope against face 94 of the cross member 14. Rope can be fed upwardly through the device to slowly lower the operator. The brake automatically snubs against the rope at portions 92 and 93 by merely releasing the tension on end 87 of the rope.

Operation of the form of the invention shown in FIG. 6 is the same in principle as just described with the further added feature that the springs 56 and 57 constantly urge the brake bar 91 upwardly so as to snub or pinch rope portions 101 and 102 in contact with portion 103 of the top member. Thus braking is accomplished automatically regardless of tension on end 87 of the line.

Operation of the form of the invention shown in FIG. 7 is the same in principle as the operation described above with the added feature that the loop of rope 104 around the roller 66 can move more easily in relation thereto. Thus it is easier to release the brake from the locked position.

An interesting use of the device shown in FIG. 7 is to use it for ascending ropes. This is most easily accomplished by using a pair of ropes and a pair of the inventions. A pair of foot stirrups are attached (one each) to the device as through opening 7. Weight is placed on one device, causing the brake to lock on to the line. On the other device, the brake is released while all the weight of the operator is on the first line and first device. The device is moved up the second line and then the weight of the operator is transferred to the second device and the second line. The brake bar locks onto the line so that all of the operators weight can now be supported on the second line. The first device is then moved up the line and the process repeated. In this manner, an operator can literally "walk" up a pair of ropes.

I claim:

1. A line apparatus comprising:
 a. a base member having an opening therein adapted for receiving a ring or flexible line;
 b. a first elongated side member connected to said base and extending therefrom at substantially a right angle and adapted for receiving an elongated flexible line wound thereon;
 c. a second elongated side member connected to said base and spaced from said first side member, extending in substantially the same plane as said base and first side member and terminating in a stub post;
 d. a cross member spaced from said base and joining said first and second sides and forming a first enclosed opening having an area several times greater than the area of a line adapted to be received therethrough;
 e. an elongated top member joining said first side member and extending at substantially right angles therefrom, spaced from said cross member and said base and in substantially the same plane therewith, and spaced from the end of said stub post forming an opening therebetween;
 f. gate means having a first position providing a clear opening between said top member and the end of said stub post and a second position closing said opening;
 g. resilient means releasably locking said gate in said second position; and
 h. said side members, said cross member, said top member and said gate means forming an enclosed opening having an area greater than said first enclosed opening.

2. A line apparatus as described in claim 1 comprising:
 a. said gate means including an elongated tube;
 b. an elongated rod positioned within said tube and moveable from a first "lock" position to a second "unlock" position;
 c. said resilient means including spring means biasing said rod to said first "lock" position;
 d. lock means operatively connected to said rod and protruding from said tube in said first position of said rod and moveable to a non-protruding position in said second "unlocked" position of said rod;
 e. said top member having an opening therethrough to permit said tube to slide therethrough and said stub post having an opening axially therethrough to permit entry of said tube and movement through a portion thereof; and
 f. stop means engaging said lock means in said first "locked" position of said rod.

3. A line apparatus as described in claim 1 comprising:
 a. a brake bar including a pair of side bracket members having portions shaped to closely and partially encircle said side members; and
 b. a roller mounted for free rotation between said bracket members and spaced from said shaped portions to closely encircle and ride freely over a face of said apparatus and being dimensioned to be in close fitting relationship with said top member and said cross member and adapted to receive a line between said roller and said top member and said cross member in binding relationship so as to prevent further sliding on said sides and to lock said line in fixed relationship therewith.

4. A line apparatus as described in claim 3 comprising:
 a. means biasing said brake bar into clamping engagement with said line at said top member.

5. A line apparatus as described in claim 1 comprising:
 a. a brake bar including a rigid band dimensioned to closely encircle said side members and to freely slide longitudinally thereover and further dimensioned to be in close fitting relationship with said top member and said cross member and adapted to receive a line between said band and said top member and said cross member in binding relationship so as to prevent further sliding on said sides and to lock said line in fixed relationship therewith.

6. A line apparatus as described in claim 5 comprising:
 a. said brake bar being formed in the shape of a C with the ends of the band occurring generally between said side members.

7. A line apparatus as described in claim 5 comprising:
 a. means biasing said brake bar into clamping engagement with said line at said top member.

8. A line apparatus as described in claim 7 comprising:
 a. said means including a pair of coil springs with said first spring mounted around said first side member between said cross member and said top member and said second spring being mounted around said gate means between said cross member and said top member.

* * * * *